US012280488B2

(12) United States Patent
Chen

(10) Patent No.: US 12,280,488 B2
(45) Date of Patent: Apr. 22, 2025

(54) HAMMER

(71) Applicant: LUCKY BRAND INDUSTRIAL CO., LTD., Taichung (TW)

(72) Inventor: Ying-Chieh Chen, Taichung (TW)

(73) Assignee: LUCKY BRAND INDUSTRIAL CO., LTD., Taichung (TW)

( * ) Notice: Subject to any disclaimer, the term of this patent is extended or adjusted under 35 U.S.C. 154(b) by 324 days.

(21) Appl. No.: 17/942,490

(22) Filed: Sep. 12, 2022

(65) Prior Publication Data

US 2024/0083011 A1 Mar. 14, 2024

(51) Int. Cl.
*B25G 3/34* (2006.01)

(52) U.S. Cl.
CPC ...................................... *B25G 3/34* (2013.01)

(58) Field of Classification Search
CPC ........................................................ B25G 3/34
USPC ........................................................ 81/20–27
See application file for complete search history.

(56) References Cited

U.S. PATENT DOCUMENTS 5,588,343 A * 12/1996 Rust ....................... B25G 1/102 81/22
5,651,631 A * 7/1997 Carmien .................. B25G 3/14 403/248
5,896,788 A * 4/1999 Hreha ...................... B25G 3/34 403/267
9,233,462 B2 * 1/2016 LaPorte ................... B25G 3/14
2014/0165787 A1 6/2014 Lombardi
2019/0255691 A1 8/2019 Paulsen

FOREIGN PATENT DOCUMENTS

| | | |
|---|---|---|
| CN | 2873437 Y | 2/2007 |
| JP | 2003019675 A | 1/2003 |
| TW | 293304 U | 12/1996 |
| TW | 401906 U | 8/2000 |
| TW | 201940294 A | 10/2019 |

OTHER PUBLICATIONS

Office Action dated Nov. 16, 2022 of the corresponding Taiwan patent application No. 111129486.

* cited by examiner

*Primary Examiner* — Hadi Shakeri
(74) *Attorney, Agent, or Firm* — Chun-Ming Shih; HDLS IPR SERVICES

(57) ABSTRACT

A hammer includes a striking head (10), a handle (20) and a combining unit (30). The striking head (10) has a passage (15). The handle (20) has an installing part (21) having a mounting member (22), first ribs (23) and second ribs (24) outwardly extended from the mounting member (22). A flowing passage (25) is formed between the first ribs (23) and the second ribs (24), and a distance (D) is formed between the first ribs (23) and an internal wall of the passage (15). A resin is filled between the installing part (21) and the passage (15) to seal the flowing passages (25) and the distance (D), and the combining unit (30) is formed through each of the first ribs (23) and each of the second ribs (24) being interlocked after the resin is solidified.

6 Claims, 6 Drawing Sheets

HAMMER

BACKGROUND OF THE DISCLOSURE

Technical Field

The present disclosure relates to a hand tool, especially to a hammer.

Description of Related Art

For a related-art hammer, there is a shortage which has yet to be solved for a long time. The shortage is the combination of a head part and a handle rod. After being used for a period of time, the combining portion of the handle rod and the head part may loosen or fall off. A minor consequence may be the tool being damaged, and a major consequence may be hurting the user or other objects. As such, the aforesaid shortage shall be improved.

U.S. Pat. No. 9,233,462B2 has disclosed a hammer including a striking head, a passage extended through the striking head, and a handle having a mounting portion disposed in the passage, and the mounting portion includes a finger and a plurality of ribs extended outwardly from the finger to define a gap between the ribs and an internal wall of the passage. A resin is filled between the mounting portion and the passage to provide an adhesive bond between the striking head and the handle. The resin is interlocked with each of the ribs to provide a mechanical bond between the striking head and the handle.

However, the gap defined between each of the ribs and the internal wall of the passage is too small, and the resin may not easily enter into intervals between each of the ribs. Moreover, a situation of the striking head and the handle being inclined, instead of being straight, may happen during the manufacturing process. As such, the yield rate is low.

Accordingly, the applicant of the present disclosure has devoted himself for improving the mentioned shortages.

SUMMARY OF THE DISCLOSURE

The present disclosure is to provide a hammer, in which a situation of a striking head and a handle being inclined during combination may be prevented to increase a yield rate of finished products.

Accordingly, the present disclosure provides a hammer including a striking head, a handle and a combining unit. The striking head has a passage penetrating the striking head. The handle has an installing part. The installing part has a mounting member, a plurality of first ribs and a plurality of second ribs outwardly extended from the mounting member. A flowing passage is formed between each of the first ribs and the adjacent second rib. The installing part is disposed corresponding to the passage, and a distance is formed between each of the first ribs and an internal wall of the passage. A resin is filled between the installing part and the passage to seal each of the flowing passages and the distance. The combining unit is formed through each of the first ribs and each of the second ribs being interlocked after the resin is solidified.

Advantages achieved by the present disclosure are as follows. A combining force defined between the striking head and the handle is reinforced through recesses and a rough surface of a core rod being formed. With each of the flowing passage being in parallel to an axial line of the handle, the resin enters into gaps of each of the first ribs with a smooth flowing speed, and a heat dissipating and air exhausting path is provided during a process of the resin being solidified. As such, the combination of the striking head and the handle is more stable and reliable.

BRIEF DESCRIPTION OF THE DRAWINGS

The features of the disclosure believed to be novel are set forth with particularity in the appended claims. The disclosure itself, however, may be best understood by reference to the following detailed description of the disclosure, which describes a number of exemplary embodiments of the disclosure, taken in conjunction with the accompanying drawings, in which:

DETAILED DESCRIPTION OF THE DISCLOSURE

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
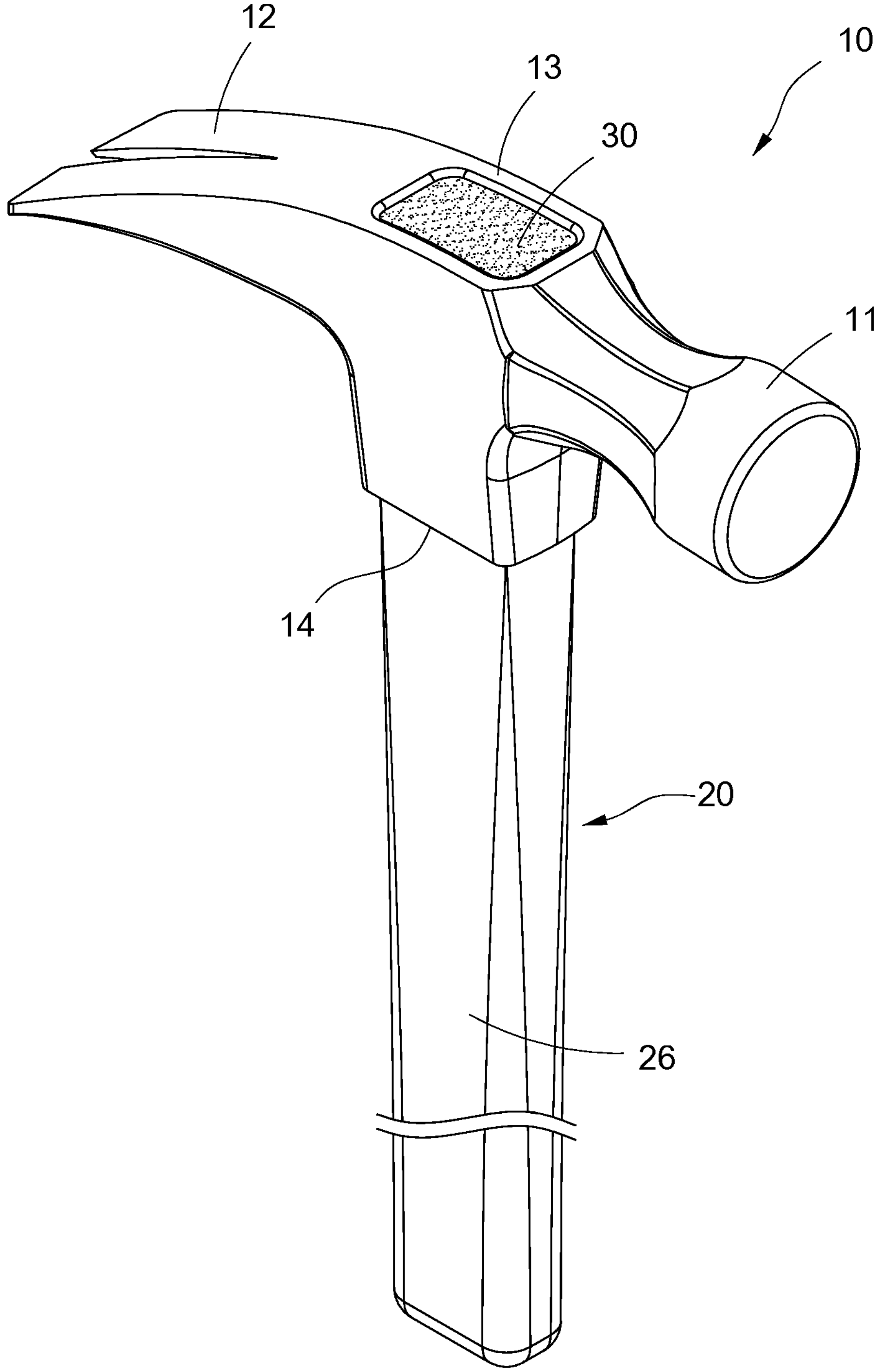
FIG. 1 is a perspective view showing the assembly of the hammer according to the present disclosure.
Figure 2:
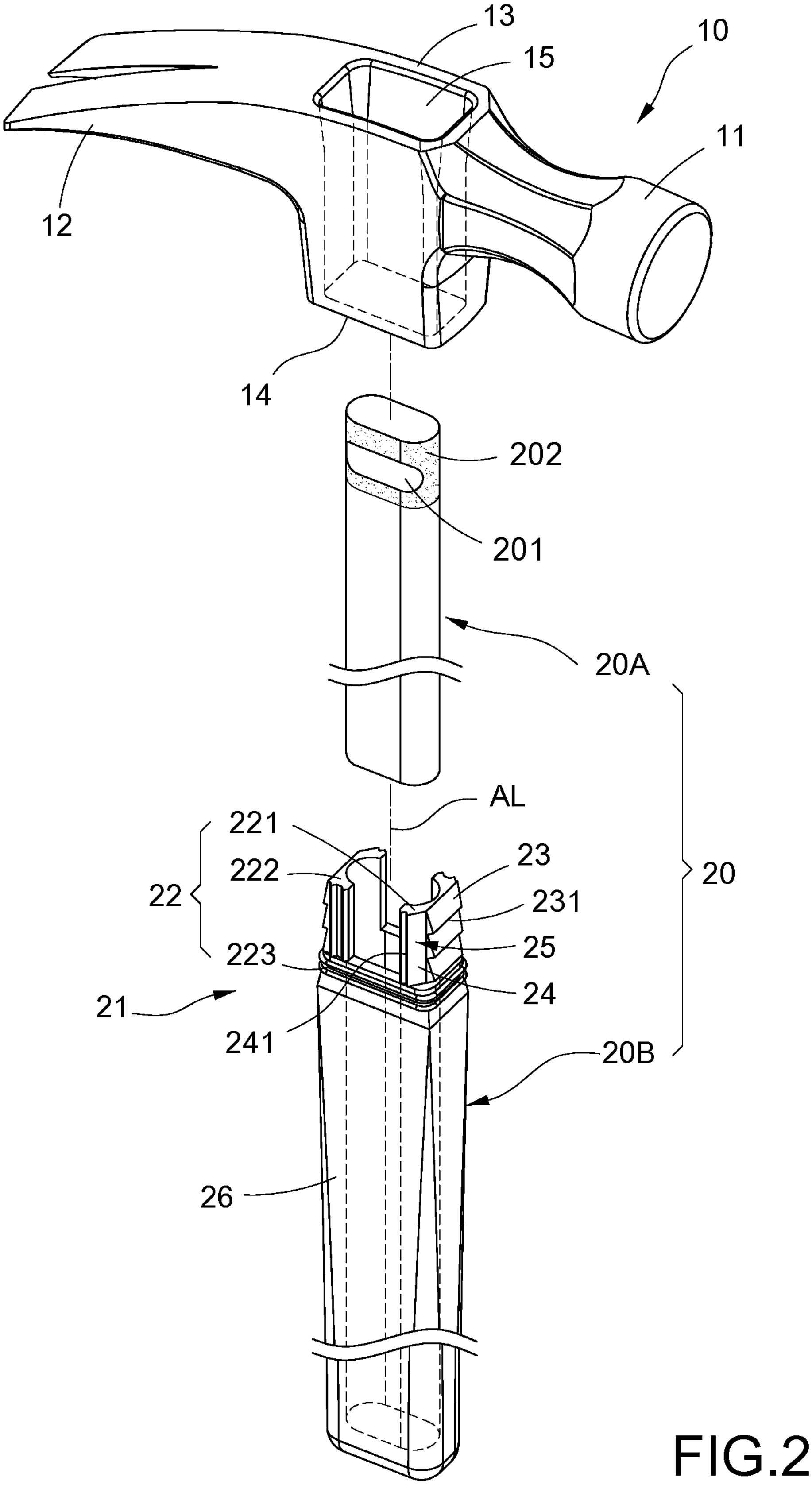
FIG. 2 is a perspective exploded view showing the hammer according to the present disclosure.
Figure 3:
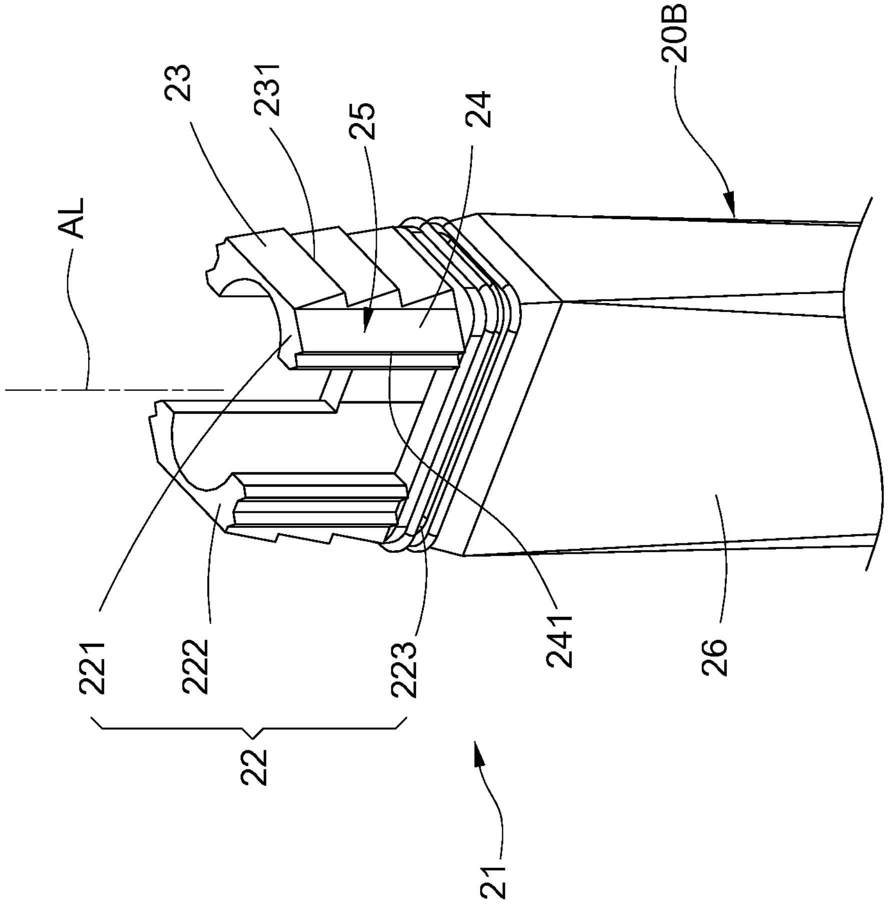
FIG. 3 is a partially enlarged view showing outer sleeve according to the present disclosure.
Figure 4:
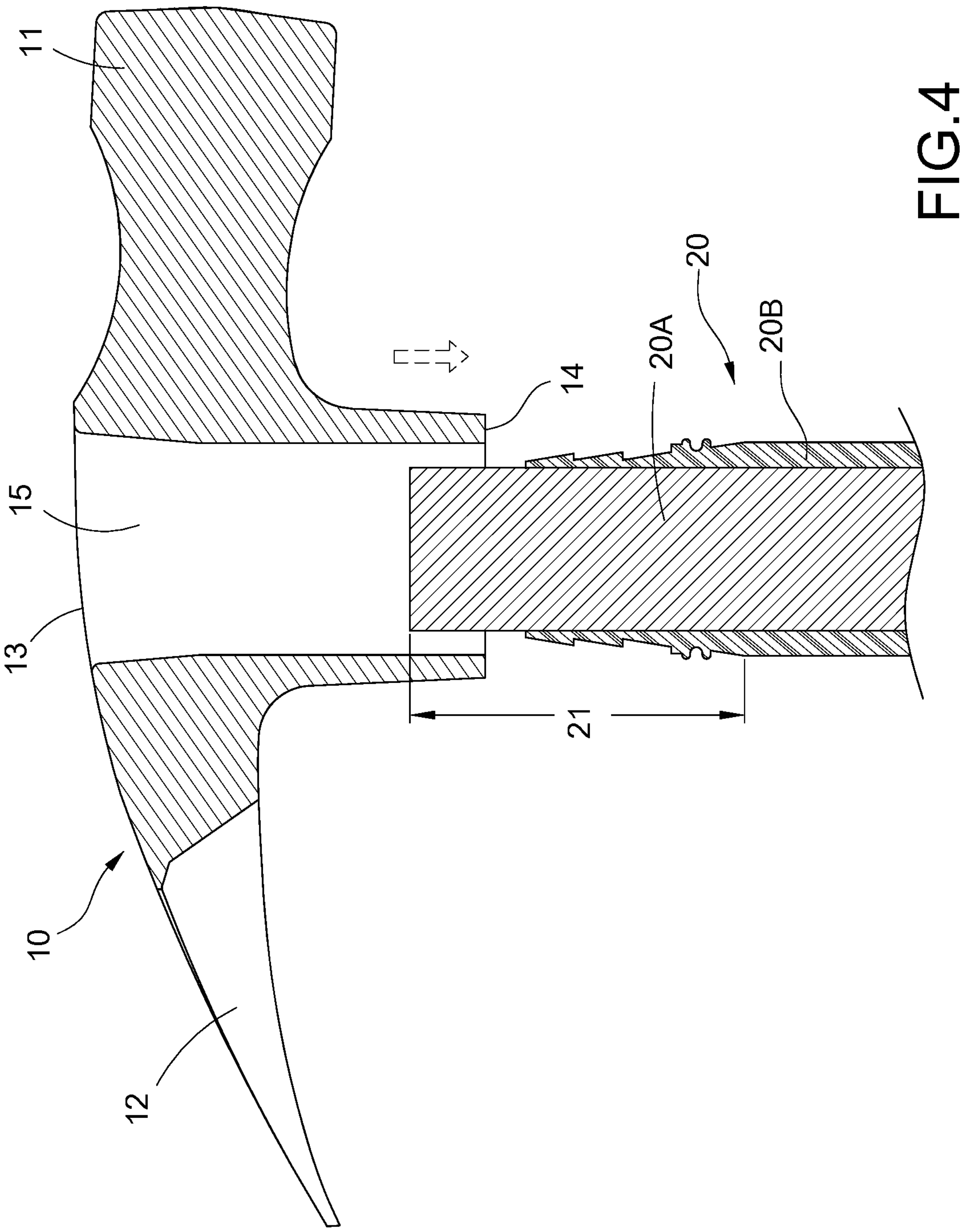
FIG. 4 is a front cross sectional view showing the striking head yet being combined with the handle according to the present disclosure.
Figure 5:
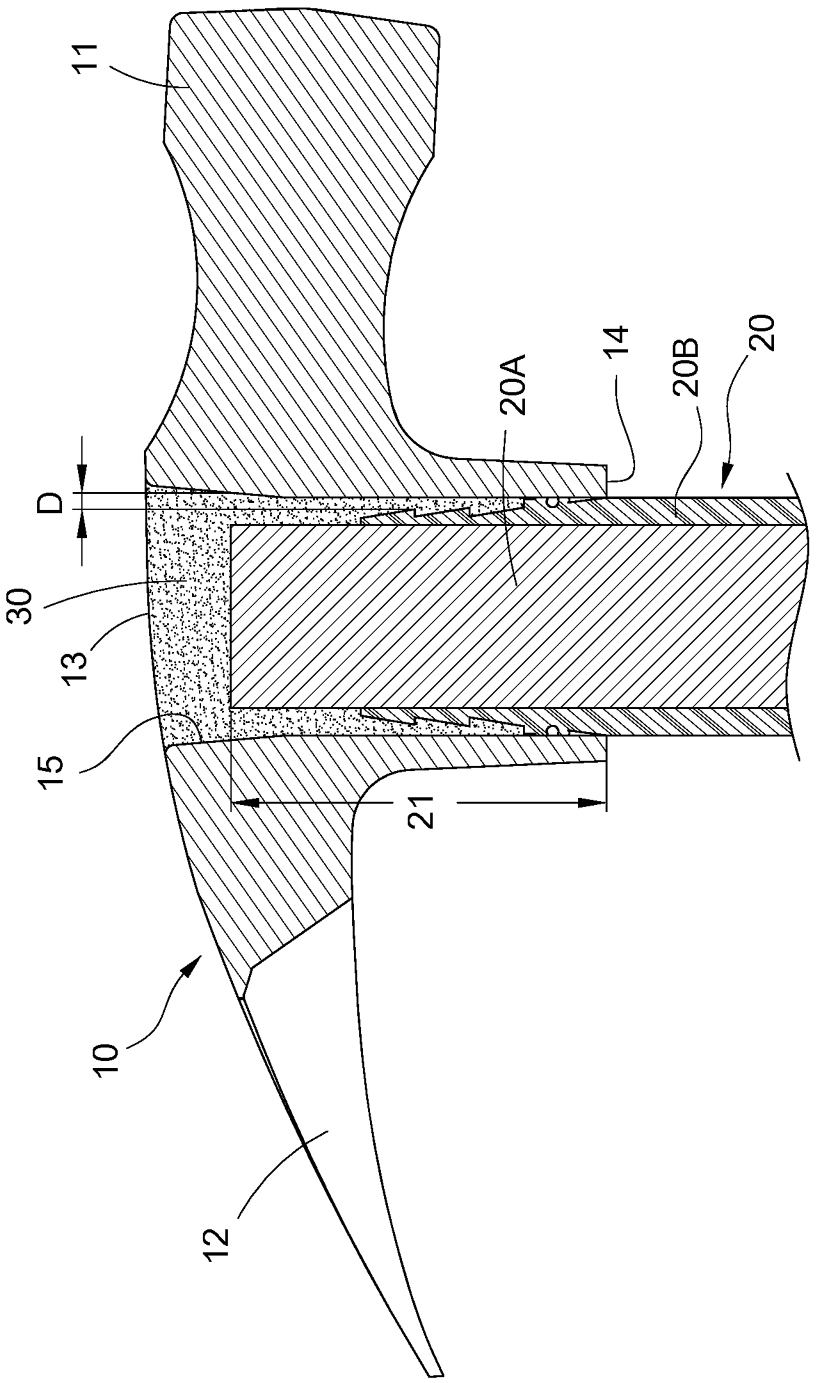
FIG. 5 is a rear cross sectional view showing the striking head being combined with the handle and the resin being filled according to the present disclosure.
Figure 7:
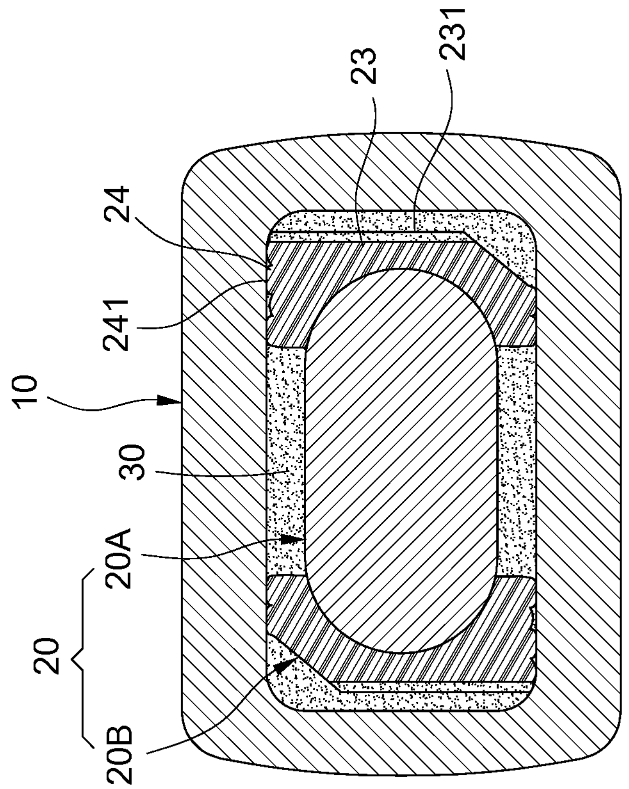
FIG. 7 is one another cross sectional view showing the striking head being combined with the handle and the resin being filled according to the present disclosure.
Figure 6:
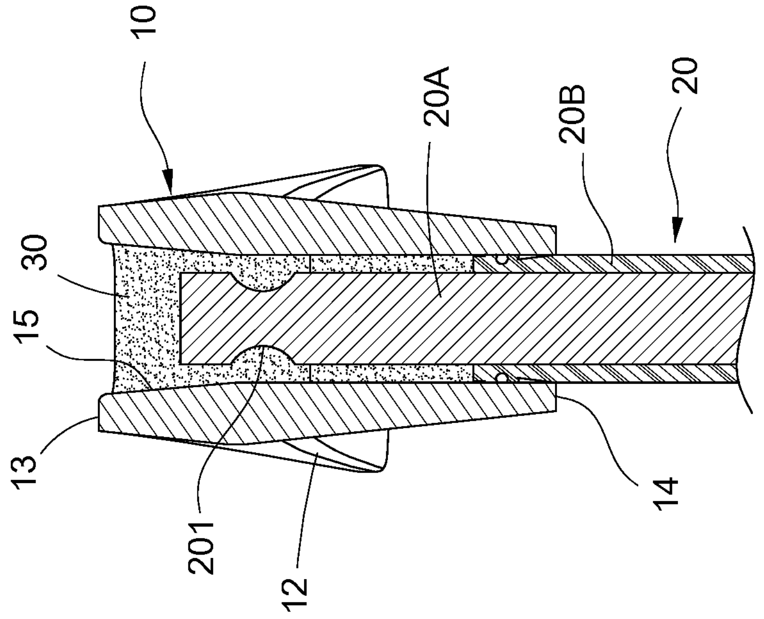
FIG. 6 is another cross sectional view showing the striking head being combined with the handle and the resin being filled according to the present disclosure.

Please refer from FIG. 1 to FIG. 3, the present disclosure provides a hammer mainly including a striking head 10, a handle 20 and a combining unit 30.

The striking head 10 is made of a material having a desirable specific weight such as a metal or an alloy. The striking head 10 mainly includes a hammering end 11, a claw end 12, a top side 13 and a bottom side 14. The top side 13 and the bottom side 14 are disposed between the hammering end 11 and the claw end 12. The striking head 10 has a passage 15 penetrating the top side 13 and the bottom side 14. In some embodiments, a cross section of the passage 15 is formed in a rectangular shape. A dimension of the passage 15 is gradually shrunk in a direction from a top side 13 toward the bottom side 14.

The handle 20 is a long thin rod and mainly includes an installing part 21 and a holding part 26 extended from the installing part 21. An axial line AL is defined on the handle 20, and the axial line AL passes the center of installing part 21 and the center of the holding part 26.

The installing part 21 mainly has a mounting member 22, a plurality of first ribs 23 and a plurality of second ribs 24. The mounting member 22 mainly has a front arm plate 221, a rear arm plate 222 disposed on the backside of the front arm plate 221 and a stop seat 223 connected with the front arm plate 221 and the rear arm plate 222, thus the mounting member 22 is substantially in a U shape. Each of the first ribs 23 is outwardly extended from an outer surface of the front arm plate 221 and an outer surface of the rear arm plate 222. The second ribs 24 are outwardly extended from two lateral surfaces of the front arm plate 221 and two lateral surfaces of the rear arm plate 222. A flowing passage 25 is formed between each of the first ribs 23 and the adjacent second ribs 24, and the flowing passages 25 communicate with each other. Each of the flowing passages 25 is in parallel to the axial line AL.

In some embodiments, each of the first ribs 23 has a transversal tip end 231. The transversal tip ends 231 are in parallel to each other and spaced with an equal interval. An extending line of each of the transversal tip ends 231 is perpendicular to the axial line AL. Each of the second ribs 24 has a longitudinal tip end 241. The longitudinal tip ends 241 are in parallel to each other and spaced with an equal interval. Each of the longitudinal tip ends 241 is in parallel to the axial line AL. The extending line of each of the transversal tip ends 231 is perpendicular to each of the longitudinal tip ends 241.

The installing member 21 is disposed corresponding to the passage 15. A distance D is formed between the transversal tip end 231 of each of the first ribs 23, the longitudinal tip end 241 of each of the second ribs 24 and an internal wall of the passage 15.

In some embodiments, the handle 20 mainly has a core rod 20A and an outer sleeve 20B. The outer sleeve 20B is adapted to sheathe an outer side of the core rod 20A. The core rod 20A is made of a material having a desirable rigidity such as carbon fibers or glass fibers. A pair of recesses 201 corresponding to each other are formed at a portion of the core rod 20A which is not covered by the outer sleeve 20B, and a rough surface 202 is formed in the recess 201 and a peripheral area thereof. The outer sleeve 20B is made of polypropylene. The mounting member 22, each of the first ribs 23 and each of the second ribs 24 are formed at one end of the outer sleeve 20B. The installing part 21 further includes an area of the core rod 20A which is not covered by the outer sleeve 20B and an area of the core rod 20A which is covered by the mounting member 22.

Please refer from FIG. 4 to FIG. 7, when being combined, the installing part 21 of the handle 20 is correspondingly disposed in the passage 15. The distance D is formed between each of the first ribs 23 and the internal wall of the passage 15. A resin is filled between the installing part 21 and the passage 15. The resin is a thermoset plastic such as Epoxy. The pasty resin flows in through each of the flowing passages 25 and a gap of any two of the adjacent second ribs 24, and flows to a gap of any two of the adjacent first ribs 23 and the distance D to seal each of the flowing passages 25 and the distance D. Accordingly, the combining unit 3 is formed through each of the first ribs 23 and each of the second ribs 24 being interlocked after the resin is solidified.

While this disclosure has been described by means of specific embodiments, numerous modifications and variations could be made thereto by those skilled in the art without departing from the scope and spirit of this disclosure set forth in the claims.

What is claimed is:

1. A hammer, comprising:

a striking head (10), comprising a passage (15) penetrating the striking head (10);

a handle (20), comprising an installing part (21), wherein the installing part (21) comprises a mounting member (22), a plurality of first ribs (23) and a plurality of second ribs (24) outwardly extended from the mounting member (22), a flowing passage (25) is defined between each of the first ribs (23) and each of the second ribs (24) adjacent to each other, the installing part (21) is disposed corresponding to the passage (15), and a distance (D) is defined between each of the first ribs (23) and an internal wall of the passage (15); and a combining unit (30), interlocked with each of the first ribs (23) and each of the second ribs (24) in a manner of a resin being filled and solidified between the installing part (21) and the passage (15) to seal each of the flowing passages (25) and the distance (D), wherein an axial line (AL) passing a center of the installing part (21) is defined on the handle (20), and each of the flowing passages (25) is in parallel to the axial line (AL);

wherein the mounting member (22) comprises a front arm plate (221), a rear arm plate (222) disposed on a backside of the front arm plate (221) and a stop seat (223) connected with the front arm plate (221) and the rear arm plate (222), and the mounting member (22) is in a U-shape;

wherein the first ribs (23) formed in steps are outwardly extended from an outer surface of the front arm plate (221) and an outer surface of the rear arm plate (222), and the second ribs (24) with inclined planes are outwardly extended from two lateral surfaces of the front arm plate (221) and two lateral surfaces of the rear arm plate (222);

wherein each of the first ribs (23) comprises a transversal tip end (231), each of the second ribs (24) comprises a longitudinal tip end (241), and an extending line of each of the transversal tip ends (231) is perpendicular to each of the longitudinal tip ends (241).

2. The hammer according to claim 1, wherein each of the first ribs (23) comprises a transversal tip end (231), multiple transversal tip ends (231) are disposed parallelly and spacedly, and an extending line of each of the transversal tip ends (231) is perpendicular to the axial line (AL).

3. The hammer according to claim 1, wherein each of the second ribs (24) comprises a longitudinal tip end (241), multiple longitudinal tip ends (241) are disposed parallelly and spacedly, and each of the longitudinal tip ends (241) is in parallel to the axial line (AL).

4. The hammer according to claim 1, wherein the handle (20) comprises a core rod (20A) and an outer sleeve (20B) adapted to sheathe an outer side of the core rod (20A), and at least one recess (201) is disposed on an area of the core rod (20A) free from covering of the outer sleeve (20B).

5. The hammer according to claim 1, wherein the handle (20) comprises a core rod (20A) and an outer sleeve (20B) adapted to sheathe an outer side of the core rod (20A), and a rough surface (202) is disposed on an area of the core rod (20A) free from covering of the outer sleeve (20B).

6. The hammer according to claim 1, wherein the handle (20) comprises a core rod (20A) and an outer sleeve (20B) adapted to sheathe an outer side of the core rod (20A), a portion of the core rod (20A) protrudes out from the outer sleeve (20B), the mounting member (22), each of the first ribs (23) and each of the second ribs (24) are disposed on the outer sleeve (20B), and the installing part (21) further comprises an area of the core rod (20A) free from covering of the outer sleeve (20B) and an area of the core rod (20A) covered by the mounting member (22).

* * * * *